United States Patent
Midmore et al.

(10) Patent No.: US 9,575,951 B2
(45) Date of Patent: *Feb. 21, 2017

(54) METHODS AND SYSTEMS OF FOUR VALUED ANALOGICAL TRANSFORMATION OPERATORS USED IN NATURAL LANGUAGE PROCESSING AND OTHER APPLICATIONS

(71) Applicant: Roger Midmore, San Francisco, CA (US)

(72) Inventors: Roger Midmore, San Francisco, CA (US); Sheldon Klien, San Francisco, CA (US)

(*) Notice: Subject to any disclaimer, the term of this patent is extended or adjusted under 35 U.S.C. 154(b) by 315 days.

This patent is subject to a terminal disclaimer.

(21) Appl. No.: 14/016,538

(22) Filed: Sep. 3, 2013

(65) Prior Publication Data
US 2015/0066476 A1 Mar. 5, 2015

Related U.S. Application Data

(63) Continuation-in-part of application No. 14/016,518, filed on Sep. 3, 2013.

(51) Int. Cl.
*G06N 7/00* (2006.01)
*G06F 17/27* (2006.01)
(Continued)

(52) U.S. Cl.
CPC .......... *G06F 17/27* (2013.01); *G06N 5/04* (2013.01); *G06N 5/02* (2013.01)

(58) Field of Classification Search
None
See application file for complete search history.

(56) References Cited

U.S. PATENT DOCUMENTS 5,692,233 A  11/1997 Garman
6,061,064 A * 5/2000 Reichlen ............... 345/418
(Continued)

OTHER PUBLICATIONS

"Algorithms for Paraconsistent Reasoning with OWL", Yue Ma, Pascal Hitzler, Zuoquan Lin, The Semantic Web: Research and Applications, Lecture Notes in Computer Science, vol. 4519, 2007, pp. 399-413.*
(Continued)

*Primary Examiner* — Omar Fernandez Rivas
*Assistant Examiner* — Mai T Tran
(74) *Attorney, Agent, or Firm* — West & Associates, A PC; Stuart West; Shaun Sluman

(57) ABSTRACT

A system for the dynamic encoding in a semantic network of both syntactic and semantic information into a common four valued logical notation. The encoding of new information being benign to prior syntactic constructions, tests for N conditionals in time O(C) and allows for the proper quantification of variables at each recursive step. The query/inference engine constructed from such an implementation is able to optimize short term memory for maximizing long term storage in the automaton. In a parallel context this can be viewed as optimizing communication and memory allocation between processes. The self-referencing system is capable of analogically extending knowledge from one knowledge source to another linearly. Disclosed embodiments include machine translation, text summarization, natural language speech recognition natural language.

16 Claims, 5 Drawing Sheets

Analogy A

X = "Boy loves light" = [0|1|0|1|0|1|0|1 / 0|0|0|0|0|0|0|0]
T F T F T F T F

Z = "Woman hates dark" = [1|0|1|0|1|0|1|0 / 0|0|0|0|0|0|0|0]
F T F T F T F T

::

Y = "Girl hates light" = [1|0|0|1|1|0|0|1 / 0|0|0|0|0|0|0|0]
F T T F F T T F

?

*X Y = [1|1|0|0|1|1|0|0 / 0|0|0|0|0|0|0|0]
F F T T F F T T

? = *Z(*X Y) = [0|1|1|0|0|1|1|0 / 0|0|0|0|0|0|0|0]
T F F T T F F T

"Man loves dark"

(51) Int. Cl.
G06N 5/04 (2006.01)
G06N 5/02 (2006.01)

(56) References Cited

U.S. PATENT DOCUMENTS

| 6,084,556 | A * | 7/2000 | Zwern | 345/8 |
|---|---|---|---|---|
| 7,233,891 | B2 * | 6/2007 | Bond et al. | 704/9 |
| 2008/0221892 | A1 * | 9/2008 | Nathan et al. | 704/257 |
| 2011/0066065 | A1 * | 3/2011 | Snyder | 600/544 |

OTHER PUBLICATIONS

Semantic Network Array Processor as a Massivley Paralllel Computing Platform for High Performance and Large-Scale Natural Language Processing, H. Kitano, D. Moldovan, COLING '92 Proceedings of the 14th conference on Computational linguistics, Nantes, 23-28 Aout 1992, vol. 2 , pp. 813-819.*
"An Overview of Rewrite Rule Laboratory (RRL)", Deepak Kapur, Hantao Zhang, Rewriting Techniques and Applications, Lecture Notes in Computer Science, vol. 355, 1989, pp. 559-563.*
"The Analogical Foundations of Creativity in Language, Culture & the Arts: the Upper Paleolithic to 2100CE", Sheldon Klein, Proceedings of the Eight International Workship on the Cognitive Science of Natural Language Processing (CSNLP-8), Aug. 9-11, 1999, 21 pages.*
"Analogical Reasoning", John F. Sowa, Arun K. Majumdar, Conceptual Structures for Knowledge Creation and Communication, Lecture Notes in Computer Science, vol. 2746, 2003, pp. 16-36.*
Kleene S."Representation of Events in Nerve Nets and Finite Automata". Rand Memorandum RM-704. USA. Dec. 1951.
Kleene S. Introduction to Metamathematics. North Holland. USA. 1952. pp. 207, 317-337, 382, 536.
Kleene S. and Richard Vesley. The Foundations of Intuitionistic Mathematics Especially in Relation to Recursive Functions. North-Holland. USA. 1965. pp. 133-163.
Kleene S. Mathematical Logic. John Wiley. New York. 1967. pp. 176, 240-241.
Kleene S."Realizability: A Retrospective Survey". Cambridge Summer School in Mathematical Logic. Edited by Mathias, R. and H. Rogers. p. 95-112. 1973. p. 104.
Kleene S. "The Theory of Recursive Functions, Approaching Its Centennial". Bulletin of the American Mathematical Society. vol. 5, No. 1. USA. Jul. 1981. pp. 57-61.
Klein S. and Robert Simmons. "A Computational Approach to the Grammatical Encoding of English Words". Journal for the Association for Computing Machinery. vol. 10 N. 3. USA.
Klein S. and Robert Simmons. "Syntactic Dependence and the Computer Generation of Coherent Discourse". Mechanical Translation, vol. 7 No. 2. USA. Aug. 1963.
Klein S. "Automatic Paraphrasing in Essay Format". Mechanical Translation, vol. 8 N. 3&4. USA. Aug.-Dec. 1965.
Klein S. "Control of Style with a Generative Grammar". Language 41: 619-631. USA. 1965.
Klein S. "Historical Change in Language Using Monte Carlo Techniques". Mechanical Translation. 9: 619-631. USA. 1966.
Klein S., Stephen Lieman and Gary Lindstrom. "Diseminer: A Distributional Semantics Inference Maker". Carnegie Mellon University Tech Report #1719. USA. 1966.
Klein S. "Current Research in the Computer Simulation of Historical Change in Language". University of Wisconsin Tech Report #6. USA. Aug. 1967.
Klein S., W. Febens, R. Herriott, W. Katke, M. Kupping & A. Towster. "The Autoling System". University of Wisconsin Tech Report #43. USA. Sep. 1968.
Klein S., M. Kuppins and K. Meives. "Monte Carlo Simulation of Language Change in Tikopia and Maori". Unversity of Wisconsin Tech Report #62. USA. Jun. 1969.
Klein S. and Michael Kuppin. "An Interactive, Heuristic Program for Learning Transformational Grammars". University of Wisconsin Tech Report #97. USA. Aug. 1970.
Klein S., J. Oakley, D. Surballe and R. Ziesmer. A Program for Generating Reports on the Status and History of Stochastically Modifiable Semantic Models of Arbitrary Universe.
Klein S. and T. Dennison. "An Interactive Program for Learning the Morphology of Natural Languages". University of Wisconsin Tech Report #144. USA. Dec. 1971.
Klein S. "Automatic Inference of Semantic Deep Structure Rules in Generative Semantic Grammars." University of Wisconsin Tech Report #180. USA. May 1973.
Klein S., J. Aeschlimann, D. Balsiger, S. Converse, C. Court, M. Foster, R. Lao, J. Oakley and J. Smith. "Automatic Novel Writing: A Status Report". University of Wisconsin Te.
Klein S. and V. Rozencevj. "A Computer Model for the Ontogeny of Pidgin and Creole Languages". University of Wisconsin Tech Report #238. USA. Dec. 1974.
Klein S. "Computer Simulation of Lanauage Contact Models". Toward Tomorrow's Linguistics. Edited by R. Shuy & C. J. Bailey. Georgetown University Press. USA. 1974.
Klein S. "Meta-Compiling Text Grammars as a Model for Human Behavior". University of Wisconsin Tech Report #252. USA. Apr. 1975.
Klein S., J. Aeschlimann, M. Appelbaum, D. Balsiger, E. Curtis, M. Foster, D. Kalish, Y. Lee and L. Price. "Forward: The History of Messy". University of Wisconsin Technical R.
Klein S., J. Aeschlimann, M. Appelbaum, D. Balsiger, E. Curtis, M. Foster, D. Kalish, Y. Lee and L. Price. Simulation D'Hypotheses Emises Par Propp & Levi-Strauss en Utilisan.
Klein S., D. Kaufer and C. Neuwirth. "The Locus of Metaphor in Frame Driven Text Grammar". University of Wisconsin Tech Report #366. USA. Sep. 1979.
Klein S. "Culture, Mysticism and Social Structure and the Calculation of Behavior". University of Wisconsin Technical Report #462. USA. 1981.
Klein S. "Analogy, Mysticism and the Structure of Culture". Current Anthropology. vol. 24 No. 2. USA. Apr. 1983. pp. 156-162.
Klein S. "The Invention of Computationally Plausible Knowledge Systems in the Upper Paleolithic". University of Wisconsin Tech Report #628. USA. Dec. 1985.
Klein S. "The Analogical Foundations of Creativity in Language, Culture & the Arts: the Upper Paleolithic to 2100 CE". Language, Vision & Music, edited by Paul McKevitt, Mulvi.
Lukasiewicz J. Aristotle's Syllogistic From the Standpoint of Modern Formal Logic. Oxford University Press. England. 1955. 2nd edition. pp. 158-173.
Siemens D. "On Klein's 'Analogy, Mysticism and the Structure of Culture'". Current Anthropology, vol. 29 No. 3. USA. Jun. 1988. pp. 472-478.
Steedman M. "Categorial Grammar". University of Pennsylvania Department of Computer and Information Science Technical Report No. MS-CIS-92-52. USA. 1992.
Troelstra A.S."From Constructivism to Computer Science". Theoretical Computer Science, No. 211, 1999. pp. 236-239.
Turing A. "Lecture to the London Mathematical Society on Feb. 20, 1947". Unpublished Manuscript. Alan Turing: His work and Impact. Edited by S. Cooper and Jan Leeuwen. Else.
Turing A. "Solvable and Unsolvable Problems". Alan Turing: His work and Impact. Edited by S. Cooper and Jan Leeuwen. Elsevier Science. United Kingdom. 2012. p. 331.
Yngve V. From Grammar to Science: New Foundations for General Linguistics. John Benjamins Publishing. Amsterdam. 1996. pp. 47-63.
Belnap N., H. Leblanc & R. Thomason. "On Not Strengthening Intuitionistic Logic". Notre Dame Journal of Formal Logic, vol. 4 No. 4. USA. Oct. 1963.
Chretien D. "Review of the Calculus of Linguistic Observations". Language, vol. 4 No. 2. USA. 1965.
Midmore R. "An Interpretation of Sheldon Klein's Four Valued Analogical Transformational Operator". University of Wisconsin Technical Report #1801. USA. Feb. 2014.

(56) References Cited

OTHER PUBLICATIONS

Norvig P. and S. Russell. Artificial Intelligence: A Modern Approach. Pearson Education Inc. New Jersey, 2003. pp. 7-8.
Shapiro S. and R. Bechtel. "A Logic for Semantic Networks". University of Indiana Technical Report #47. USA. Mar. 1976.
Meini C. and A. Paternoster. "Understanding Language Through Vision". Artificial Intelligence Review vol. 10, pp. 37-48. USA. 1996.
Wachsmuth I., B. Lenzmann, T. Jording, B. Jung, M. Latoschik and M. Frohlich. "A Virtual Interface Agent and It's Agency". Proceedings of the First International Conference o.
Herdan G. Type Token Mathematics. Mouton & Co. Gravenhage, Hague. 1960. pp. 263-269.
Herdan G. The Structralistic Approach to Chinese Grammar and Vocabulary. Mouton & Co. The Hague. 1964. pp. 24-36.
Reichenbach H. The Theory of Probability. University of California Press. Berkeley and Los Angeles. USA. 1949. pp. xi, 387-401.
Lamport L. "Time, Clocks and the Ordering of Events in a Distributed System". Communications of the ACM. vol. 21 No. 7. USA. 1978.
Englemore, R. and Tony Morgan. Blackboard Systems . . . Addisson Wesley Publishers. New York. 1988. pp. 475-490.
Halton, J. "A Retrospective and Prospective Survey of the Monte Carlo Method". University of Wisconsin Computer Science Tech Report #13. Feb. 1968.
Hays D., Bozena Henisz-Dostert and Marjorie Rapp (editor). "Annotated Bibliography of Rand Publications in Computational Linguistics". Rand Memorandum RM-3894-3. 1965. pp. 1.
Hays D., Marjorie Rapp, Boana Henisz-Dostert & Jean Houston (editors). "Bibliography of Computational Linguitics 1964". Rand Memorandum RM-4523-PR Mar. 1965. pp. 1-5.
Hays ., Marjorie Rapp, Boana Henisz-Dostert & Jean Houston (editors). "Bibliography of Computational Linguistics 1965". Rand Memorandum 4986-PR. Apr. 1966. pp. 1-5.
Hays D., M, Boana Henisz-Dostert & Jean Houston (editors). "Bibliography of Computational Linguistics 1966". Rand Memorandum RM-5345-PR. Apr. 1967. pp. 1-5.
Hays D., Boana Henisz-Dostert & Jean Houston (editors). "Bibliography of Computational Linguistics 1967". Rand Memorandum RM-5733-PR. Jul. 1968. pp. 1-5.
Hays D, Boana Henisz-Dostert, Jean Houston & Dolores Lofgren (editors). "Bibliography of Computational Linguistics 1968". Rand Memorandum RM-6233-PR. Jan. 1970. pp. 1-5.
Herdan G. The Advanced Theory of Language as Choice or Chance. Spring-Verlag. The Hague 1966. pp. 438-445.

* cited by examiner

Analogy A

X = "Boy loves light" = `0 1 0 1 0 1 0 1` / `0 0 0 0 0 0 0 0` T F T F T F T F

Y = "Girl hates light" = `1 0 0 1 1 0 0 1` / `0 0 0 0 0 0 0 0` F T T F F T T F

*X Y = `1 1 0 0 1 1 0 0` / `0 0 0 0 0 0 0 0` F F T T F F T T

::

Z = "Woman hates dark" = `1 0 1 0 1 0 1 0` / `0 0 0 0 0 0 0 0` F T F T F T F T

?

? = *Z(*X Y) = `0 1 1 0 0 1 1 0` / `0 0 0 0 0 0 0 0` T F F T T F F T

"Man loves dark"

FIG. 1

Analogy B

X = |0|1|0|1|0|0|0|1|1|1|1|1|1|1|1|
    |0|0|0|0|0|0|0|0|1|1|1|1|1|1|1|
    T F T F T F T F U U U U U U U

Y = |1|0|0|1|1|0|0|0|1|1|1|1|1|1|1|
    |0|0|0|0|0|0|0|0|1|1|1|1|1|1|1|
    F T F F T T F U U U U U U U

*X Y = |1|1|0|0|1|1|0|0|0|0|0|0|0|0|0|
       |0|0|0|0|0|0|0|0|0|0|0|0|0|0|0|
       F F T T F F T T T T T T T T T

::

Z = |1|0|1|0|1|0|1|0|0|1|1|1|1|1|1|
    |0|0|0|0|0|0|0|0|1|1|1|1|1|1|1|
    F T F T F T F T U U U U U U U

?

? = *Z (*X Y) = |0|1|1|0|0|1|1|0|1|1|1|1|1|1|1|
                |0|0|0|0|0|0|0|0|1|1|1|1|1|1|1|
                T F F T T F F T U U U U U U U

"Man loves dark"

FIG. 2

Diagram of the arrays(with size = N) associated with each Semantic Node

METHODS AND SYSTEMS OF FOUR VALUED ANALOGICAL TRANSFORMATION OPERATORS USED IN NATURAL LANGUAGE PROCESSING AND OTHER APPLICATIONS

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to machine implemented means and systems of natural language analysis. More particularly, disclosed embodiments relate to two bit vector systems used to test the design, implementation and performance of self-referencing programs in a generative syntax paradigm.

(2) Description of the Related Art

In the related art, various computer implemented systems and methods exist for language analysis. But, the related art suffers from computational inefficiencies.

Thus, there is a long felt need in the art for the disclosed embodiments.

BRIEF SUMMARY OF THE INVENTION

The present invention overcomes shortfalls in the related art by presenting an unobvious and unique combinations, configurations and use of methods, systems to efficiently use a two bit vector system to preserve logical properties of truth tables and to for use in analogical reasoning in the design and implementation of self-referencing programs. Disclosed systems and methods include subjecting existing language databases to stochastic methods, pattern matching and analogical inferences for analysis, summarization translation to a target language.

Disclosed systems and methods include the storage of both positive and negative response to grammatical inferences, and metaphors from an informant, the results used to aid in the design of self-referencing programs and heuristics for natural language inferences and translations.

Disclosed systems and methods include use of virtual reality systems, the virtual reality systems comprising a virtual reality display with audio inputs. Embodiments include means and methods to test spatial, surrealistic, metaphoric and other relationships observed within multimedia inputs, the test results used to aid in unsupervised video pattern matching and text summarization.

Disclosed systems and methods include character generation and modeling of a personal assistant in virtual reality, the assistant having means and methods to accept text of spoken commands for user interaction and in adding search queries requested by the user.

One argumentation for the derivation of these family logic is by treating the Boolean Klein-Four Group as a primary logical structure. This logical grouping is explicitly modeled for its computational efficiencies and logical characteristics. All disclosed embodiments may be implemented over a network.

BRIEF DESCRIPTION OF THE DRAWINGS

FIG. 1 depicts a schematic of the encoding of truth values showing the analogical properties of the encoding before information has been added to the semantic network. It's a modified example taken from a paper by Prof. Klein, "The Analogical Foundations of Creativity in Language, Culture and the Arts: the Upper Paleolithic to 2100 CE," in Proceedings of The Eighth International Workshop on the Cognitive Science of Natural Language Processing (1999), edited by Paul McKevitt et al., Information Technology Centre, National University of Ireland, Galway, pp. 20-32. The analogies are computed using the XOR operator (* in the diagram) to model analogies instead of the strong equivalence operator.

FIG. 2 depicts a schematic of the encoding of truth values showing the analogical properties of the encoding after information has been added to the semantic network with the same analogy in FIG. 1. It's a modified example taken from a paper by Prof. Klein, "The Analogical Foundations of Creativity in Language, Culture and the Arts: the Upper Paleolithic to 2100 CE," in Proceedings of The Eighth International Workshop on the Cognitive Science of Natural Language Processing (1999), edited by Paul McKevitt et al., Information Technology Centre, National University of Ireland, Galway, pp. 20-32. The analogies are computed using the XOR operator (* in the diagram) to model analogies instead of the strong equivalence operator.

DETAILED DESCRIPTION OF EMBODIMENTS OF THE INVENTION

Figure 3:
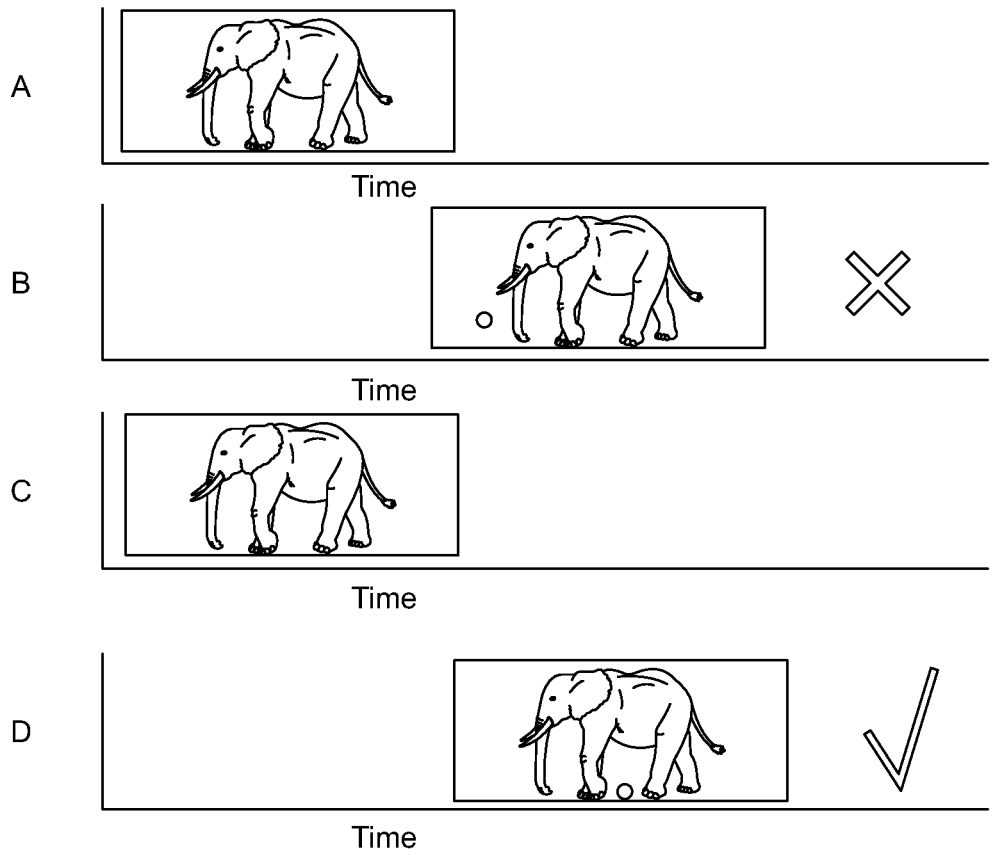
FIG. 3 depicts a training example using virtual reality for self-referencing programs

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Under the heading References is the academic literature specifically referenced in the application and is essential to the underlying invention.

Under the heading Further Reading is the academic literature relating to other academic work on this area of logic, added to assist patent searches and validate the mathematical claims of novelty. It is the mathematical properties of the four valued logics that have to be to correctly represent in implementations of the semantic network described Prof. by Sheldon Klein.

REFERENCES

Englemore, R. and Tony Morgan, (1988). *Blackboard Systems*. New York. Addisson Wesley Publishers.

Kleene, S., (1951) "Representation Of Events In Nerve Nets And Finite Automata". Rand Memorandum RM-704. December.

Kleene, S., (1952). *Introduction to Metamathematics*. North Holland.

Kleene, S. and Richard Vesley, (1965). *The Foundations Of Intuitionistic Mathematics Especially In Relation To Recursive Functions*. North-Holland.

Kleene, S., (1967). *Mathematical Logic*. John Wiley. New York.

Kleene, S., (1973). "Realizability: A Retrospective Survey". *Cambridge Summer School in Mathematical Logic*. Edited by Mathias, R. and H. Rogers. p. 95-112.

Kleene, S., (1981). "The Theory of Recursive Functions, Approaching Its Centennial". Bulletin of the American Mathematical Society. Vol. 5, Number 1, July 1981.

Klein, S., Stephen Lieman and Gary Lindstrom, (1966). "DISEMINER: A Distributional Semantics Inference Maker". Carnegie Mellon University Tech Report #1719.

Klein, S., John Aeschlimann, Matthew Appelbaum, David Balsiger, Elizabeth Curtis, Mark Foster, David Kalish, Ying-Da Lee and Lynee Price., (1976). FORWARD: The History of MESSY. University of Wisconsin Technical Report #272.

Klein, S., John Aeschlimann, Matthew Appelbaum, David Balsiger, Elizabeth Curtis, Mark Foster, David Kalish, Ying-Da Lee and Lynee Price. (1976) "Simulation D'Hypotheses Emises Par Propp & Levi-Strauss en Utilisant un Systeme de Simulation Meta-Symbolique". Informatique et Sciences Humaines. N. 28 Mars.

Klein, S. (1981). "Culture, Mysticism and Social Structure and the Calculation of Behavior". University of Wisconsin Technical Report #462.

Klein, S. (1988). "Reply to S. D. Siemens' critique of S. Klein's 'Analogy and Mysticism and the Structure of Culture (Klein 1983)'. Current Anthropology 29. P. 478-483.

Klein, S. (2002). "The Analogical Foundations of Creativity in Language, Culture & the Arts: the Upper Paleolithic to 2100 CE". Language, Vision & Music, edited by Paul McKevitt, Mulvihill & Nuallin. John Benjamin, pp. 347-371.

Midmore, R. (2014). "An interpretation of Sheldon Klein's Four Valued Analogical Transformational Operator". University of Wisconsin Tech Report #1801.

Steedman, M., (1992). "Categorial Grammar". University of Pennsylvania Department of Computer and Information Science Technical Report No. MS-CIS-92-52.

Yngve, V., (1996). *From Grammar to Science: New Foundations for General Linguistics*. Amsterdam.

FURTHER READING

Brouwer, E., (1981). *Brouwer's Cambridge Lecture on Intuitionism*. Edited by D. van Dalen.

Dubarle, D., (1977). *Logos et Formalisation Du Langage*. Paris. Dubarle, D., (1989). "Essai sur la generalisation naturelle de la logique usuelle (premier memoire)" Mathematiques et sciences humaines, vol. 107. p. 17-73.

Halton, J., (1968). "A Retrospective and Prospective Survey Of The Monte Carlo Method". University of Wisconsin Computer Science Tech Report #13. February 1968.

Herdan, G. (1966). The *Advanced Theory of Language as Choice or Chance*. Spring-Verlag.

Lukasiewicz, J. (1955). *Aristotle's Syllogistic From the Standpoint of Modern Formal Logic*. 2nd edition. Oxford.

Piaget, J., (1952). "Essai sur les transformations des operations logiques. Les 256 operations ternaires de la logique bivalente". Paris Piaget, J., (1953). *Logic and Psychology*. Manchester University Press.

Reichenbach, H., (1949). *The Theory of Probability*. Los Angeles. (Proofed by Stephen Kleene)

Troelstra, A. S., (1999). "From Constructivism to Computer Science". Theoretical Computer Science, num. 211, 1999 p. 233-252.

Turing, Alan, (1947). "Lecture To The London Mathematical Society on 20 Feb. 1947". Unpublished Manuscript. In Alan Turing: His work and Impact. Edited by S. Cooper and Jan Leeuwen. 2012.

Turing, Alan, (1954). "Solvable and Unsolvable Problems". *Science News*, no. 31, p. 7-23

All the above references and U.S. patents and applications are incorporated herein by reference. Aspects of the invention can be modified, if necessary, to employ the systems, functions and concepts of the various patents and applications described above to provide yet further embodiments of the invention.

REFERENCE NUMBERS

100 non transitory machine readable media containing machine readable instructions

200 a processor, general or specialized, receiving machine readable instructions from the machine readable media 100

300 memory, in communication with the processor 200

410 a database of encoded values of truth tables, such as the tables shown in FIG. 1 and FIG. 2.

420 a database of virtual reality tests, such as the test or process shown in FIG. 3

Figure 4:
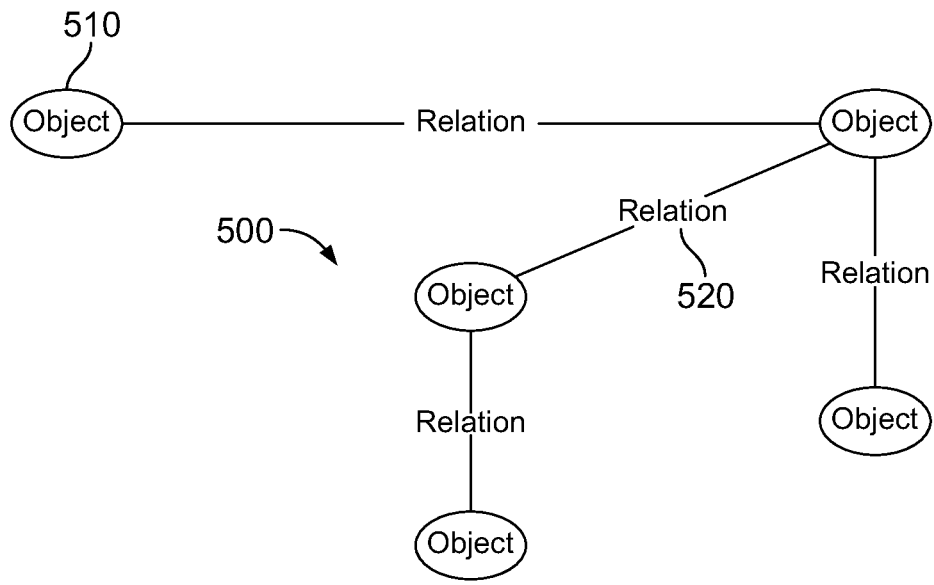
FIG. 4 is a graphical representation of a semantic network

430 a database of one or more semantic networks, such as the network of FIG. 4

Figure 5:
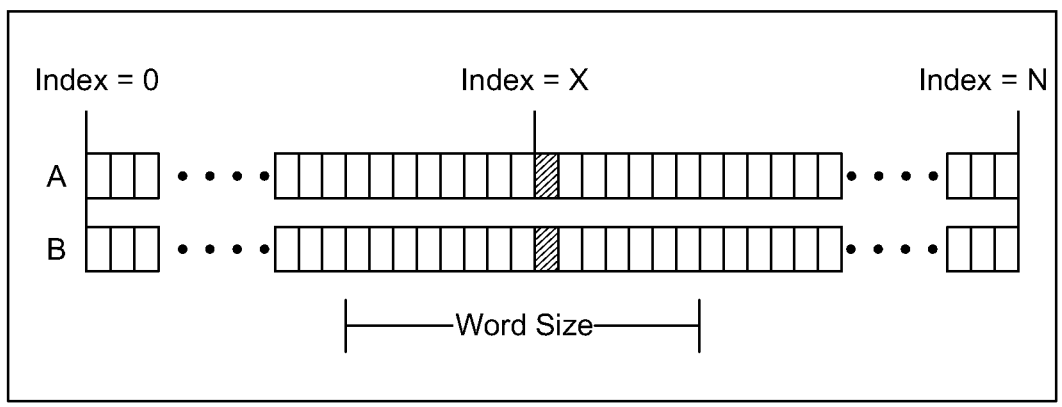
FIG. 5 depicts the assignment of a property to a particular index within array

440 a database of arrays associated with each semantic note, such as the array shown in FIG. 5

450 a database of informants, or other components or information systems as disclosed herein
500 a semantic network in general
510 an object of a semantic network
520 a relation of a semantic network Referring to FIG. 1, depicts a schematic of the encoding of truth values showing the analogical properties of the encoding before information has been added to the semantic network. Referring to analogy A in FIG. 1, it shows how the system solves analogical problems using the exclusive-or operator, before new information needed to model other analogies in other domains is added to the semantic network.

Referring again to FIG. 1 properties are mapped into the two bit vector array from left to right, with the values (male, female, young, adult, love, hate, light and dark). The analogical computation forms analogies between existing nodes in the network to analogically create new nodes and syntactic constructions for the system.

Referring to FIG. 2, depicts a schematic of the encoding of truth values showing the analogical properties of the encoding after information has been added to the semantic network. Referring to analogy B in FIG. 2, it shows how the system solves analogical problems using the exclusive-or operator, after new information needed to model other analogies in other domains is added to the semantic network.

Referring again to FIG. 2 properties are mapped into the two bit vector array from left to right, with the values (male, female, young, adult, love, hate, light, dark outer square, outer circle, outer light, outer dark, inner square, inner circle, inner light and inner dark). The analogical computation forms analogies between existing nodes in the network to analogically create new nodes and syntactic constructions for the system.

Referring to FIG. 3, a training example using virtual reality for self-referencing programs is shown. The system is attempting to semantically model visuo-spatial relations for a target language with informant verification. Considering the sentence, "put a ball to the left of the elephant", frame A shows a scene containing an elephant that the system knows to be correct for a specific instance of time.

Frame B shows an inference by the system for a semantic parse of the test sentence presented to the informant, The "X" on the right hand side of the frame denote a rejection or negative response by the informant. As far as the system may discern, there may be multiple reasons for the rejection. Such reasons may include incorrect visuo-spatial errors, syntactic errors and visual analogies, metaphors and surrealistic imagery.

The system stores the information from the informant as learned in frame B, and then back tracks or retreats an earlier correct instance, as shown in frame C.

Frame D shows an inference by the system for a semantic parse of the test sentence presented to the informant, the check mark on the right hand side of the frame denotes an acceptance or positive response by the informant. The positive response by the informant confirms the correct values of many variables, such variables may include visuo-spatial, syntax, visual analogies, metaphors and surrealistic imagery.

Referring to FIG. 4, a graphical representation of a semantic network is shown with objects and relations, with all objects and relations being nodes in memory.

FIG. 5, depicts a graphical representation of the two bit vector array associated with the semantic node in memory. FIG. 5 further shows the assignment of the truth value across the two arrays, with X being a specific index into the array. The word size in the figure is a consequence of word size limitations in computer architecture. This causes a chunking factor in memory when accessing the array which is done in theoretical time O(C).

Figure 6:
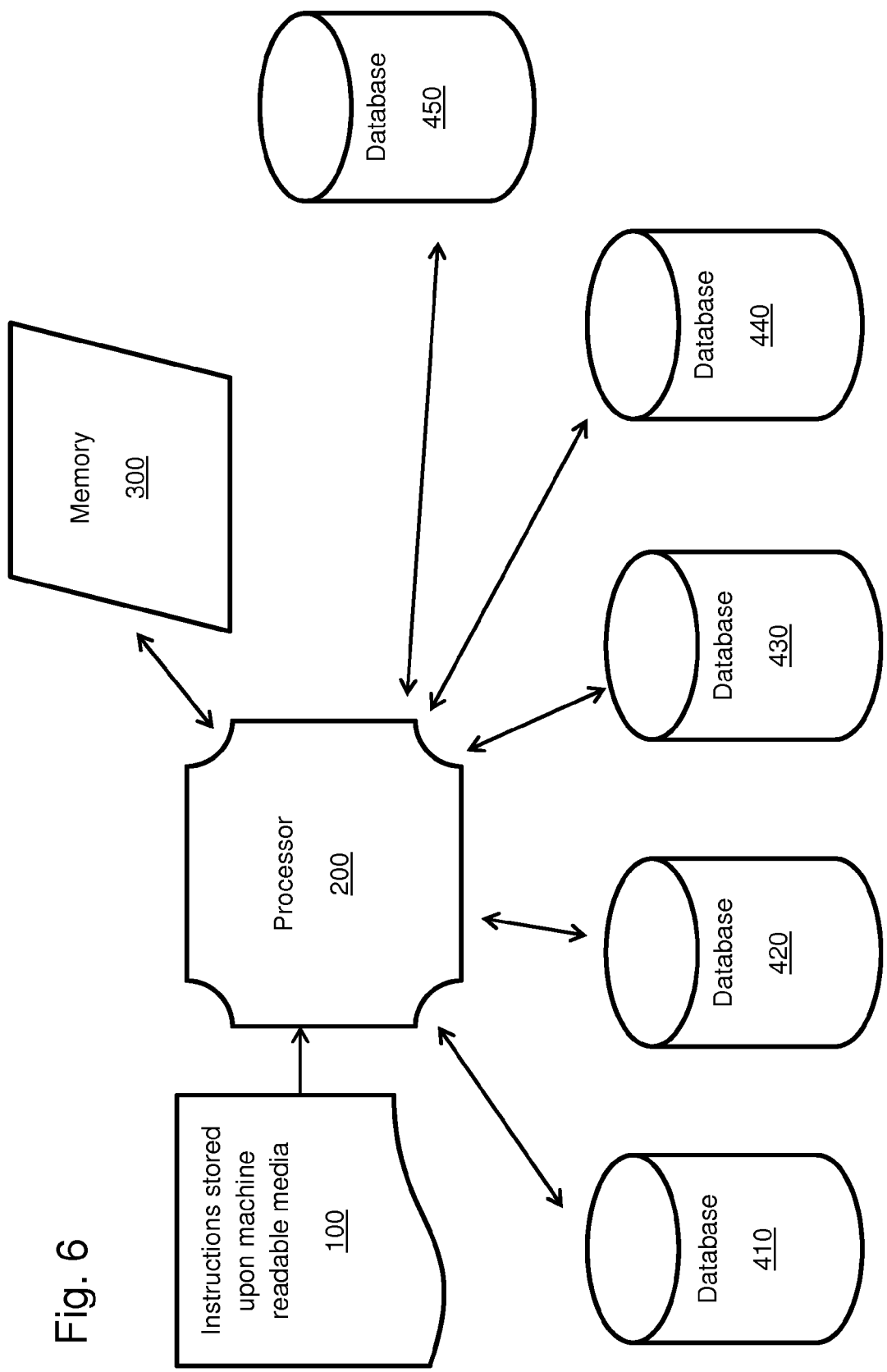
FIG. 6 depicts a machine implementation of disclosed embodiments These and other aspects of the present invention will become apparent upon reading the following detailed description in conjunction with the associated drawings.

Referring to FIG. 6 a machine implementation is depicted and comprises non-transitory, non-signal, computer readable media 100 having machine readable instructions, the machine readable instructions may include instructions to carry out the disclosed embodiments. The computer readable media 100 supplies machine readable instructions to a general purpose or specialized processor 200. The processor may be in communication with memory 300, user interfaces, input output interfaces, an informant, other disclosed components and a plurality of databases, the databases comprising a database 410 of encoded values of truth tables, such as the tables shown in FIG. 1 and FIG. 2, a database 420 of virtual reality tests or implementations, such as the test or processes shown in FIG. 3, a database 430 or one or more semantic networks, such as the network of FIG. 4, a database 440 of one or more arrays associated with each semantic node, such as the array shown in FIG. 5, a database 450 of informants or other components or information systems disclosed herein.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments include the following Items:

Item 1. A machine implemented method of executing a four-valued logic to optimize short term memory and to maximize long term storage, the method comprising:

using symbols comprising (F, T, U, D) to represent the values false, true, undefined, and defined, mapped into a dynamic two bit vector array; the values further mapped into indexes within the two vector dynamic arrays and stored as nodes within a semantic network;

for F, T, U, D, defined into set theory, such as { } for undefined, {T} for true, {F} for false, and {T, F} for defined, these values are interpreted as properties {P} for T and, {¬P} false, { } for undefined and {P, ¬P} for defined, which are the properties used for testing the conditionals and quantifying variables for successive recursive steps in the predicate calculus;

c) defining a logic with a negation, ignoring monotonic argumentations, with the following binary connectives: for the logical AND (ˆ), NOT (¬); and logical OR (V) connectives as follows used to prove the completeness of the logics:

¬F is T
¬T is F
¬U is D
¬D is U;

d) for the ˆ connective
ˆ F T U D
F F F F F
T F T U D
U F U U F
D F D F D;

e) for the V connective
V F T U D
F F T U D

T T T T T
U U T U T
D D T T D;

f) optimizing short term memory maximizing long term storage by the linear encoding of syntactic and semantic information into the semantic network;

g) in a parallel context optimizing short term memory to maximize long term storage becomes optimizing communication and memory between different knowledge sources, (processes);

h) using the use of a phrase structure rewrite rule associated with a node within the semantic network for the testing and passing of the rewrite rule;

i) implementing a top/down bottom/up parser capable of a plurality of syntactic parses of a grammar;

j) using the symbols comprise {S} for start, {Np} for noun phrase, {Vp} for verb phrase and {Pp} for prepositional phrase (predicate participant) for natural language processing; and k) using terminal symbols comprising {N} for noun, {V} for verb, {det} for determinant and {prep} for preposition.

Item 2. The system of item 2 modeling truth value true to {0,0} for a specific index into the two bit vectors to preserve logical properties for the use of analogical reasoning in the design and implementation of self-referencing programs in a generative syntax paradigm.

Item 3. The system of item 2 using the exclusive-or operator for analogical computations.

Item 4. The system of item 3 using stochastic methods, pattern matching and analogical inferences on existing corpuses, grammars of a target language, for analysis, summarization in the target language and translations into other languages.

Item 5. The system of item 4 storing both positive and negative responses to grammatical inferences, analogies, metaphors from an informant, to aid the design of self-referencing programs and heuristics for natural language inferences and translations.

Item 6. The system of item 5 further augmented by a virtual reality system, the virtual reality system comprising a virtual reality display with audio input.

Item 7. The system of item 6 using a virtual reality display to propose and test spatial, surrealistic/metaphoric or other relationships in its learning algorithms to aid unsupervised video pattern matching within the corpuses and text summarization of other multimedia in the target language or other languages.

Item 8. The system item 7 further used for character generation and modeling of a personal assistant in virtual reality, the assistant able to accept text or spoken commands for user interaction in aiding search queries of the user.

Item 9. The system of item 8 implemented over a network.

Item 10. The system of item 9 implemented with machine readable instructions stored upon a non-transitory computer readable media, the instruction sent to general processor 200, the general processor in communication with memory 300 and the general processor in communication with a plurality of databases, the databases including a database of encoded values of truth tables, a database of one or more semantic networks and a database of arrays associated with semantic nodes of the semantic networks.

Item 11. The system of item 10 wherein the processor is a specialized computer processor.

Item 12. The system of item 10 including a database of informants and a database of virtual reality tests.

Item 13. The system of item 12 including a database of video pattern matching results.

Item 14. The system of item 13 including a database of a target language.

Item 15. The system of item 14 including a database of stochastic methods.

What is claimed is:

1. A machine implemented method of executing four-valued logic in a semantic network, the method comprising:
   defining a logic system having a NOT logical connective denoted as "¬" an AND logical connective denoted as "∧," and an OR logical connective denoted as "v," wherein false values are represented with an "F" symbol, true values are represented by a "T" symbol, undefined values are represented by a "U" symbol, and defined values are represented by a "D" symbol, such that for a property P false values are in a set {¬P}, true values are in a set {P}, undefined values are in a set { }, defined values are in a set {P, ¬P}, wherein said logic system is proven complete and w-consistent by a set of statements comprising:
   ¬F is T, ¬T is F, ¬U is D, ¬D is U;
   F∧F is F, F∧T is F, F∧U is F, F∧D is F;
   T∧F is F, T∧T is T, T∧U is U, T∧D is D;
   U∧F is F, U∧T is U, U∧U is U, U∧D is F;
   D∧F is F, D∧T is D, D∧U is F, D∧D is D;
   FvF is F, FvT is T, FvU is U, FvD is D;
   TvF is T, TvT is T, TvU is T, TvD is T;
   UvF is U, UvT is T, UvU is U, UvD is T; and
   DvF is D, DvT is T, DvU is T, DvD is D;
   generating a semantic network representing digitally stored information, said semantic network comprising a plurality of object nodes and a plurality of relationships between said plurality of object nodes, by:
      providing a first vector and a second vector in digital memory for each of said plurality of object nodes, each of said first vector and said second vector being a dynamically allocated array having a plurality of index positions each with a size of one bit;
      linearly encoding semantic information for an object node by storing two bits that together encode a false value, true value, undefined value, or defined value, a first bit of said two bits being stored at an index position within the first vector associated with the object node, and a second bit of said two bits being stored at the same index position within the second vector associated with the object node; linearly encoding syntactic information associated with said plurality of relationships in said digital memory; and
   testing conditionals or quantifying variables in said semantic network during successive recursive steps in a predicate calculus using said logic system, the false values, true values, undefined values, and defined values in the semantic information associated with said plurality of object nodes, and the syntactic information associated with said plurality of relationships, and a phrase structure rewrite rule on said plurality of object node; and
   using a top/down, bottom/up parser to syntactically parse grammar within said semantic network, by marking subsets of said plurality of object nodes as {S} for start, {Np} for a noun phrase, {Vp} for verb a phrase and {Pp} for a prepositional phrase (predicate participant), and marking each of said plurality of object nodes as {N} for a noun, {V} for a verb, {det} for a determinant and {prep} for a preposition,
   wherein linear encoding of said semantic information and said syntactic information optimizes short term memory, maximizes long term storage, and optimizes communication and memory between different knowledge sources or processes.

2. The method of claim 1, further comprising modeling a true value by setting said first bit to zero and said second bit to zero within the first vector and the second vector associated with an associated object node, to preserve logical properties for the use of analogical reasoning in design and implementation of self-referencing programs in a generative syntax paradigm.

3. The method of claim 2, further comprising using an exclusive-or operator for analogical computations.

4. The method of claim 3, further comprising using stochastic methods, pattern matching and analogical inferences on existing corpuses, and grammars of a target language for analysis, summarization in said target language, and translations into other languages.

5. The method of claim 4, further comprising storing both positive and negative responses to grammatical inferences, analogies, and metaphors from an informant, to aid the design of self-referencing programs and heuristics for natural language inferences and translations.

6. The method of claim 5, wherein said semantic network is implemented within a virtual reality system comprising a virtual reality display with audio input.

7. The method of claim 6, further comprising using said virtual reality display to propose and test spatial, surrealistic/metaphoric, other relationships in learning algorithms to aid unsupervised video pattern matching within corpuses and text summarization of other multimedia in said target language or other languages.

8. The method of claim 7, further comprising character generation and modeling of a personal assistant in virtual reality based on said semantic network, said personal assistant being configured to accept text or spoken commands for user interaction in aiding search queries of a user.

9. The method of claim 8, wherein said text or spoken commands are transmitted to said top/down, bottom/up parser from said virtual reality system over a network.

10. The method of claim 9, wherein testing conditionals and/or quantifying variables, parsing grammar, and/or linear encoding is performed according to machine readable instructions stored upon a non-transitory computer readable medium that are sent to general processor in communication with memory and a plurality of databases, wherein said plurality of databases comprises a database of encoded values of truth tables, a database of one or more semantic networks, and a database of arrays associated with semantic object nodes of the semantic networks.

11. The method of claim 10, wherein said processor is a specialized processor.

12. The method of claim 10, wherein said plurality of databases further comprises a database of informants and a database of virtual reality tests.

13. The method of claim 12, wherein said plurality of databases further comprises a video stream database storing one or more inputted video streams.

14. The method of claim 13, wherein said plurality of databases further comprises a database of video pattern matching results.

15. The method of claim 13, wherein said plurality of databases further comprises a database of said target language.

16. The method of claim 13, wherein said plurality of databases further comprises a database of stochastic methods.

* * * * *